(12) United States Patent
Srivastava et al.

(10) Patent No.: US 6,982,046 B2
(45) Date of Patent: Jan. 3, 2006

(54) LIGHT SOURCES WITH NANOMETER-SIZED VUV RADIATION-ABSORBING PHOSPHORS

(75) Inventors: Alok Mani Srivastava, Niskayuna, NY (US); Anant Achyut Setlur, Niskayuna, NY (US); Sergio Paulo Martins Loureiro, Saratoga Springs, NY (US); Darryl Stephen Williams, Albuquerque, NM (US); Mohan Manoharan, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 16 days.

(21) Appl. No.: 10/674,376

(22) Filed: Oct. 1, 2003

(65) Prior Publication Data

US 2005/0073239 A1 Apr. 7, 2005

(51) Int. Cl.
*H01J 1/63* (2006.01)
*C09K 11/08* (2006.01)
*B32B 5/16* (2006.01)

(52) U.S. Cl. ............... 252/301.4 R; 252/301.4 P; 252/301.4 S; 252/301.4 H; 252/301.4 F; 428/403; 428/404; 313/487; 313/639; 313/640

(58) Field of Classification Search ......... 252/301.4 H, 252/301.4 F, 301.4 S, 301.4 P, 301.4 R; 428/404, 403; 313/640, 639, 487
See application file for complete search history.

(56) References Cited

U.S. PATENT DOCUMENTS

| | | | |
|---|---|---|---|
| 4,262,231 | A | 4/1981 | Anderson et al. |
| 5,624,602 | A | 4/1997 | Lenox et al. |
| 5,952,791 | A | 9/1999 | Watanabe et al. |
| 5,958,361 | A | 9/1999 | Laine et al. |
| 5,959,405 | A | 9/1999 | Soules et al. |
| 6,051,922 | A | 4/2000 | Schlejen et al. |
| 6,137,236 | A | 10/2000 | Michiels et al. |
| 6,734,631 | B2 * | 5/2004 | Juestel et al. ............... 313/640 |
| 2002/0171356 | A1 | 11/2002 | Setlur et al. |
| 2002/0185960 | A1 | 12/2002 | Setlur et al. |
| 2003/0011310 | A1 | 1/2003 | Juestel et al. |
| 2003/0032192 | A1 | 2/2003 | Haubold et al. |

FOREIGN PATENT DOCUMENTS

| | | |
|---|---|---|
| EP | 0993020 | 9/1999 |
| WO | 0220695 | 9/2001 |
| WO | 0220696 | 9/2001 |

OTHER PUBLICATIONS

GE Global Research technical proposal to DOE, Apr. 14, 2003.*

R. Baranwal et al., "Flame Spray Pyrolysis of Precursors as a Route to Nano-Mullite Powder: Powder Characterization and Sintering Behavior", J. Am. Ceram. Soc., vol. 84, 951-961 (2001).

W. Que et al., "Preparation and Characterization of Erbium Oxalate and Erbium Oxide Nanoparticles by Microemulsion Technique", Mat. Sci. & Eng. C, vol. 16, 51-54 (2001).

(Continued)

*Primary Examiner*—C. Melissa Koslow
(74) *Attorney, Agent, or Firm*—Jason K. Klindtworth; Jean K. Testa

(57) ABSTRACT

A light source comprises: (a) a source of plasma discharge that emits electromagnetic radiation, a portion of which has wavelengths shorter than about 200 nm; and (b) a phosphor composition that comprises particles, each of the particles comprising at least a first phosphor and at least a second phosphor, the phosphor composition is disposed such that the first phosphor absorbs substantially the portion of EM radiation having wavelengths shorter than about 200 nm, and the first phosphor emits EM radiation having wavelengths longer than about 200 nm.

24 Claims, 1 Drawing Sheet

OTHER PUBLICATIONS

R. Subramaman et al., "Synthesis of Nanocrystalline Yttria by Sol-Gel Method", Mat. Lett., vol. 48, 342-346 (2001).

R. Ramesh et al., "Optical Properties of Ce3+ in Self-Assembled Strontium Chloro(hydroxy) Apatite Nanocrystals", J. Phys. Chem. B, vol. 104, 8351-8360 (2000).

T.S. Ahmadi et al., "Low Temperature Synthesis of Pure and Mn-Doped Willemite Phosphor (Zn2SIO4:mn) in Aqueous Medium", Mat. Res. Bull., vol. 35, 1869-1879 (2000).

"Novel Nanophosphors for High-Efficiency Fluorescent Lamps", Technical Proposal submitted to US DOE. Apr. 14, 2003.

K. Riwotzki et al., Liquid Phase Synthesis of Colloids and Redispersible Powders of Strongly Luminescing LAPO4: Ce, Tb Nanocrystals, Agnew. Chem. Int. Ed., vol. 40, No. 3, 573 (2001).

M. Kottaisainy et al. Yttrium Oxide: Eu3+ Red Phosphor by Self-Propagating High Temperature Synthesis, Mat. Res. Bull., vol. 31, No. 8, 1013 (1996).

H. Tsuboi et al., "Synthesis and Fluorescence Properties of Eu2+—Complex-Doped—SiO2 Gels", J. Am. Ceram. Soc., vol. 81, No. 5, 1197 (1998).

C. Feldman et al., "Preparation of Sub-Micrometer LnPO4 Particles (In=La,Ce)", J. Mat. Sci., vol. 37, 3251 (2002).

S. Nichihama et al., "The Preparation of Rare Earth Phosphate Fine Particles in an Emulsion Liquid Membrane System", J. Mater. Chem., vol. 12, 1053 (2002).

I.W. Lenggoro et al., "Synthesis of LaPO4: Ce,Tb Phosphor Particles by Spray Pyrolysis", Mat. Lett., vol. 50, 92 (2001).

* cited by examiner

US 6,982,046 B2

LIGHT SOURCES WITH NANOMETER-SIZED VUV RADIATION-ABSORBING PHOSPHORS

BACKGROUND OF THE INVENTION

The present invention relates to gas discharge devices. In particular, the present invention relates to gas discharge light sources having vacuum ultraviolet ("VUV") radiation-absorbing phosphors.

Light generation in mercury low-pressure gas discharge lamps is based on the principle that during the gas discharge, a plasma develops in the mercury-containing gas filling within a lamp and emits electromagnetic ("EM") radiation predominantly in the ultraviolet ("UV") wavelength range. The UV radiation emitted by a low-pressure mercury discharge concentrates at wavelengths of about 254 nm and about 185 nm. A phosphor, which is typically coated on the lamp housing, is employed to convert the UV radiation into visible light.

A drawback of known mercury low-pressure gas discharge lamps resides in that the action of UV radiation having very short wavelengths on the phosphor coating, the recombination of mercury ions and electrons on the phosphor surface, or the incidence of excited mercury atoms and electrons on the phosphor layer causes the emissivity of the phosphors to decrease in the course of time. This emissivity loss results in a reduction of the electro-optical efficiency in the course of the service life of the lamp. This degradation is particularly substantial under the influence of VUV (vacuum UV) radiation having a wavelength below 200 nm, and manifests itself as a shift of the color of light.

Therefore, effort has been devoted to finding means to reduce the damaging effect of VUV radiation on the phosphors of mercury discharge lamps. For example, U.S. Pat. No. 5,624,602 discloses the use of a mixture of phosphor particles and particles of aluminum oxide having a particle size of about 20 nm for a coating on the inner surface of the lamp housing. The aluminum oxide particles absorb the VUV radiation, but are transparent with respect to UV radiation having wavelength of 254 nm. As can be appreciated, this method would still allow some VUV radiation to be incident on the phosphor particles. In addition, aluminum oxide does not emit any light, thus, does not help to increase the efficiency of the lamp. U.S. patent application Ser. No. 2003/0011310 A1 discloses a two-layer phosphor coating. The first layer exposed to the mercury discharge is a very dense layer of a phosphor that is capable of absorbing VUV radiation and emitting in the wavelength range of 230 to 280 nm. The second layer is disposed between the first layer and the inner surface of the lamp housing and includes phosphors that absorb the longer-wavelength UV radiation and emit visible light. This method would add some manufacturing cost because of the need to form an additional very dense top layer (the first layer) to protect the underlying phosphor layer.

Therefore, it is desirable to continue to search for other means to reduce the damaging effect of the VUV radiation on the phosphors used in mercury discharge lamps to maintain the luminous output of these devices. It is also very desirable to achieve this goal and to improve the electro-optical efficiency of these devices at the same time.

BRIEF SUMMARY OF THE INVENTION

A light source comprises: (a) a source of plasma discharge that emits electromagnetic ("EM") radiation, a portion of which has wavelengths shorter than about 200 nm; and (b) a phosphor composition that comprises a plurality of particles, each of said particle comprising at least a first phosphor and at least a second phosphor, said phosphor composition being disposed such that said first phosphor absorbs substantially said portion of EM radiation having wavelengths shorter than about 200 nm, and said first phosphor emitting EM radiation having wavelengths longer than about 200 nm.

In one aspect of the present invention, the first phosphor forms a protective shell around a particle of the second phosphor.

In another aspect of the present invention, the first phosphor comprises a plurality of nanometer-sized particles disposed on the surface of each of the particles of the second phosphor.

In another aspect of the present invention, the particles of the first phosphor are substantially transparent to EM radiation having wavelengths longer than about 200 nm.

In still another aspect of the present invention, the second phosphor absorbs the portion of EM radiation emitted by the plasma discharge that has wavelengths longer than about 200 nm and the radiation emitted by the first phosphor, and emits EM radiation having wavelengths in the visible spectrum.

In still another aspect of the present invention, a method for making a light source comprises: (a) providing a source of plasma discharge that emits EM radiation, a portion of which has wavelengths shorter than about 200 nm; (b) containing said source of plasma discharge in a sealed housing; and (c) disposing a phosphor composition in said sealed housing, which phosphor composition comprises a plurality of particles of at least a first phosphor and at least a second phosphor, said particles of said at least a first phosphor having a nanometer size, said phosphor composition being disposed such that said first phosphor absorbs substantially said portion of EM radiation having wavelengths shorter than about 200 nm, and said first phosphor emitting EM radiation having wavelengths longer than about 200 nm.

According to another aspect of the present invention, the source of plasma discharge comprises mercury gas, which produces a plasma discharge upon application of a voltage across the mercury gas.

Other features and advantages of the present invention will be apparent from a perusal of the following detailed description of the invention and the accompanying drawings in which the same numerals refer to like elements.

DETAILED DESCRIPTION OF THE INVENTION

Figure 1:
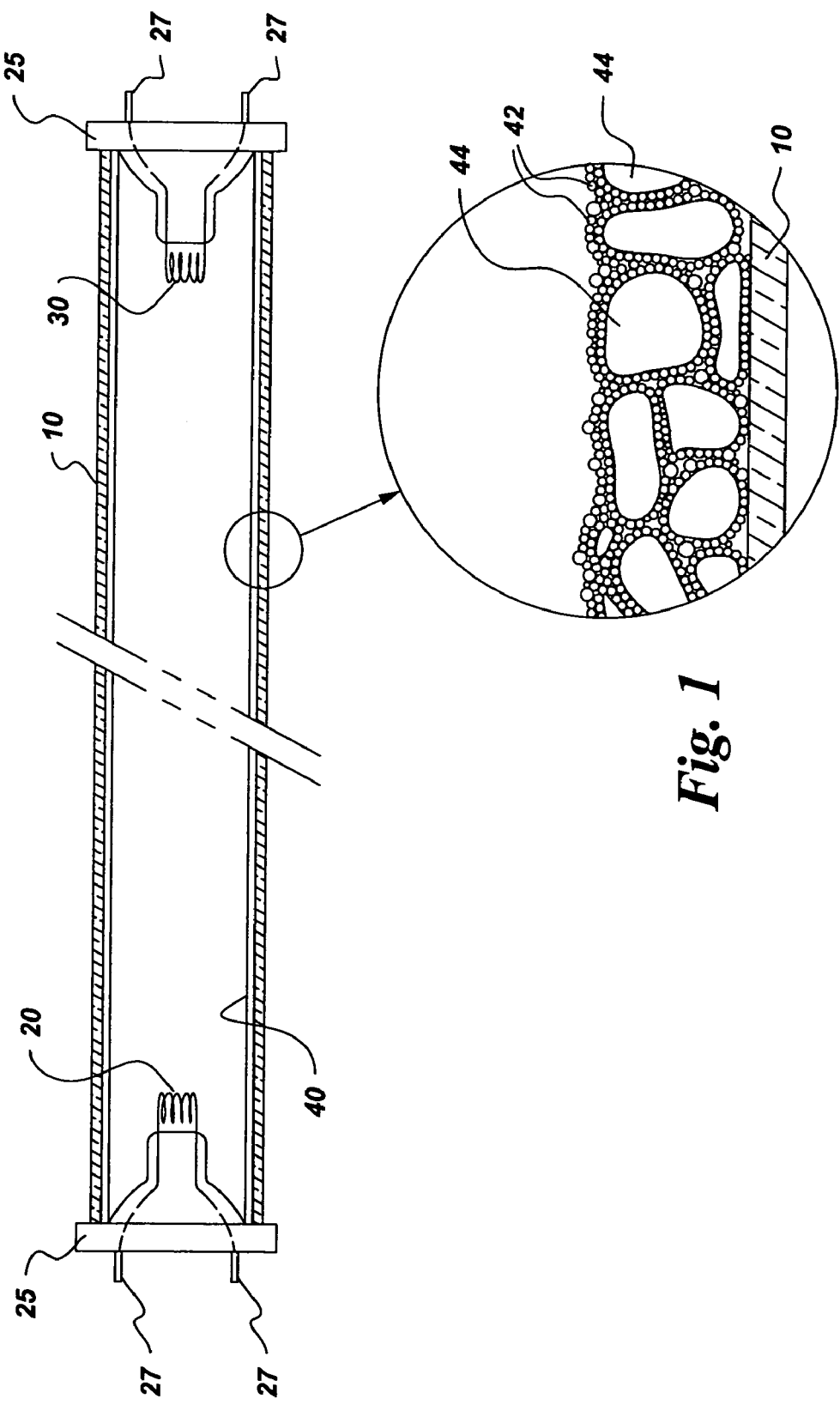
FIG. 1 schematically illustrates a light source of the present invention.

In the present disclosure, the terms "EM radiation" and "light" are used interchangeably. A light source, which is based on mercury gas discharge, comprises: (a) a source of plasma discharge that comprises mercury gas, which produces a plasma discharge that emits EM radiation, a portion of which has wavelengths shorter than about 200 nm; and (b) a phosphor composition that comprises a plurality of particles, each of said particle comprising at least a first phosphor and a second phosphor, said phosphor composition being disposed such that said first phosphor absorbs substantially said portion of EM radiation having wavelengths shorter than about 200 nm, and said first phosphor emitting EM radiation having wavelengths longer than about 200 nm.

According to one aspect of the present invention, the source of plasma discharge is contained in a sealed housing that is substantially transparent. The terms "substantially transparent" and "optically substantially transparent" mean allowing at least about 80 percent of light having wavelengths in the range from about 400 nm to about 800 nm to transmit through a thickness of about 1 mm at an incident angle of less than 10 degrees.

In one embodiment, the light source is a fluorescent lamp based on mercury discharge, as shown in FIG. 1. A housing 10 comprising an optically substantially transparent material, such as glass or quartz, is provided with a pair of electrodes 20 and 30 disposed at opposite ends of housing 10. In one embodiment, electrodes 20 and 30 are of the hot-cathode type with a coil filament made of a material such as tungsten and coated with an electron-emitting material, such as a mixture of oxides of barium, calcium, and strontium. Electrical leads 27 are provided through end caps 25 to supply electrical power to electrodes 20 and 30. Housing 10 is evacuated and then charged with a small amount of mercury and at least an inert gas, such as argon, at a pressure up to about 4000 Pa at room temperature. One or more other inert gases (such as helium, neon, krypton, and/or xenon) may be used in place of argon. The amount of mercury is enough to provide a mercury vapor pressure of about $6 \times 10^{-3}$ torr (or about 0.8 Pa) at a temperature of 40 C. A layer 40 of particles 42 of at least a first phosphor and particles 44 of at least a second phosphor is disposed on the inner surface of housing 10. The particles 44 of the second phosphor have a size in the range from about 1 to about 6 micrometers, preferably from about 2 to about 6 micrometers. The surface of each of the particle 44 of the second phosphor is coated with nanometer-sized particles 42 of the first phosphor. Preferably, particles 42 of the first phosphor cover substantially an entire surface of the particle 44 of the second phosphor. The coating comprising the particles 42 of the first phosphor can be one or more than one particle thick. The particles 42 of the first phosphor have a size in the range from about 1 nm to about 500 nm, preferably from about 1 nm to about 200 nm, more preferably from about 1 nm to about 100 nm, and most preferably from about 1 nm to about 30 nm. Each of the particles 42 of the first phosphor can comprises one or more crystallites of the first phosphor material. The crystallites of the first phosphor material have a nanometer size; for example, in the range from about 0.5 nm to about 30 nm, and preferably from about 1 nm to about 20 nm.

In another embodiment, the first phosphor forms a protective shell around a particle of the second phosphor. This protective shell can be continuous or discontinuous. A shell is discontinuous if it has a gap therein. The protective shell can be discontinuous as long as such discontinuity does not lead to substantial degradation of the luminescent property of the second phosphor with use. Preferably, the protective shell does not substantially attenuate the transmission of EM radiation having wavelengths greater than about 200 nm. For example, the shell thickness can be in the range of about 1 nm to about 200 nm, preferably from about 1 nm to about 100 nm, and more preferably from about 1 nm to about 30 nm.

The first phosphor is capable of absorbing VUV radiation and emitting in the wavelength range greater than 200 nm. Preferably, the particles of the first phosphor or the protective layer comprising the first phosphor absorbs substantially all of the VUV radiation emitted by the plasma generated by the mercury discharge. In one embodiment, the first phosphor emits radiation in the range of wavelengths longer than about 200 nm. In another embodiment, the first phosphor emits radiation in the wavelength range from about 200 nm to about 400 nm, preferably from about 220 nm to about 300 nm, and more preferably from about 230 nm to about 270 nm. Non-limiting examples of the first phosphor are $LaPO_4$: $Pr^{3+}$, $LaB_3O_6$:$Pr^{3+}$, $LaBO_3$:$Pr^{3+}$, $YBO_3$:$Pr^{3+}$, $GdBO_3$:$Pr^{3+}$, $LuBO_3$:$Pr^{3+}$, $(Gd,Y)B_3O_6$:$Pr^{3+}$, $(Sr,Ca)Al_{12}O_{19}$:$Pr^{3+}$, $(La,Gd,Y)MgB_5O_{10}$:$Pr^{3+}$, $SrB_4O_7$:$Pr^{3+}$, $CaMgAl_{11.33}O_{19}$:$Pr^{3+}$, $CaMgAl_{14}O_{23}$:$Pr^{3+}$, $YPO_4$:$Pr^{3+}$, $GdPO_4$:$Pr^{3+}$, $Y_2SiO_5$:$Pr^{3+}$, and $YPO_4$:$Bi^{3+}$, $LuPO_4$:$Bi^{3+}$. Activator ions of $Pb^{2+}$ can also be used in the foregoing hosts, either alone or in combination with at least one of $Pr^{3+}$ and $Bi^{3+}$, to yield VUV radiation-absorbing phosphors (e.g.; $LaPO_4$:$Pr^{3+}$,$Pb^{2+}$; $LaB_3O_6$:$Pr^{3+}$,$Pb^{2+}$; $LaBO_3$:$Pr^{3+}$, $Pb^{2+}$; $LaBO_3$:$Pr^{3+}$,$Pb^{2+}$; $YBO_3$:$Pr^{3+}$,$Pb^{2+}$; $GdBO_3$:$Pr^{3+}$,$Pb^{2+}$; $LuBO_3$:$Pr^{3+}$,$Pb^{2+}$; $(Gd,Y)B_3$ $O_6$:$Pr^{3+}$,$Pr^{2+}$; $(Sr,Ca)Al_{12}O_{19}$:$Pr^{3+}$,$Pb^{2+}$; $(La,Gd,Y)MgB_5O_{10}$:$Pr^{3+}$,$Pb^{2+}$; $SrB_4O_7$:$Pr^{3+}$,$Pb^{2+}$; $CaMgAl_{11.33}O_{19}$:$Pr^{3+}$,$Pb^{2+}$; $CaMgAl_{14}O_{23}$:$Pr^{3+}$,$Pb^{2+}$; $YPO_4$:$Pr^{3+}$,$Pr^{2+}$; $GdPO_4$:$Pr^{3+}$,$Pb^{2+}$; $Y_2SiO_5$:$Pr^{3+}$,$Pb^{2+}$; $YPO_4$:$Bi^{3+}$,$Pb^{2+}$; $LuPO_4$:$Bi^{3+}$, $Pb^{2+}$; $LaPO_4$:$Pr^{3+}$,$Pb_{2+}$,$Bi^{3+}$; $LaB_3O_6$:$Pr^{3+}$,$Pb^{2+}$,$Bi^{3+}$; $LaBO_3$:$Pr^{3+}$,$Pb^{2+}$,$Bi^{3+}$; $YBO_3$:$Pr^{3+}$,$Pb^{2+}$,$Bi^{3+}$; $GdBO_3$:$Pr^{3+}$,$Pb^{2+}$,$Bi^{3+}$; $LuBO_3$:$Pr^{3+}$,$Pb^{2+}$,$Bi^{3+}$; $(Gd,Y)B_3O_6$:$Pr^{3+}$,$Pb_{2+}$,$Bi^{3+}$; $(Sr,Ca)Al_{12}O_{19}$:$Pr^{3+}$,$Pb^{2+}$,$Bi^{3+}$; $(La,Gd,Y)MgB_5O_{10}$:$Pr^{3+}$, $Pb^{2+}$,$Bi^{3+}$; $SrB_4O_7$:$Pr^{3+}$,$Pb^{2+}$,$Bi^{3+}$; $CaMgAl_{11.33}O_{19}$:$Pr^{3+}$,$Pb^{2+}$, $Bi^{3+}$; $CaMgAl_{14}O_{23}$:$Pr^{3+}$,$Pb^{2+}$, $Bi^{3+}$; $YPO_4$:$Pr^{3+}$,$Pb^{2+}$,$Bi^{3+}$; $GdPO_4$:$Pr^{3+}$,$Pb^{2+}$,$Bi^{3+}$; $Y_2SiO_5$: $Pr^{3+}$,$Pb^{2+}$,$Bi^{3+}$; $YPO_4$:$Pr^{3+}$,$Bi^{3+}$,$Pb^{2+}$; or $LuPO_4$:$Pr^{3+}$,$Bi^{3+}$, $Pb^{2+}$). Other suitable first phosphors are $(Ca,Mg,Sr)SO_4$: $Pb^{2+}$, $CaLi_2SiO_4$:$Pb^{2+}$, $(Ca,Ba,Sr)SiO_3$:$Pb^{2+}$, $Ba(Y,Gd,Lu)B_9O_{16}$:$Bi^{3+}$, $YF_3$:$Bi^{3+}$, $YOF$:$Bi^{3+}$, $(Gd,Y)OF$:$Bi^{3+}$,$Pr^{3+}$, and $(Y,Gd)_3Al_5O_{12}$:$Bi^{3+}$. More than one type of first phosphors can be used that have strong absorption in different ranges of wavelengths shorter than 200 nm, for example, to ensure that substantially all of the VUV emitted by the plasma is absorbed.

The second phosphor absorbs the portion of radiation emitted by the plasma discharge that has wavelengths longer than about 200 nm, preferably the portion from about 200 nm to about 400 nm, and the radiation emitted by the first phosphor. Phosphors that absorb in the wavelength range from about 230 nm to about 280 nm can also be used as the second phosphor. The second phosphor emits visible light upon absorbing EM radiation having shorter wavelengths. More than one type of second phosphors can be used in the phosphor composition, for example, to produce visible light having different colors. For example, when white light is desired from a light source of the present invention, a blend of different second phosphors emitting in the blue, green, and red wavelength ranges can be used. A light source of the present invention can use a combination of $BaMg_2Al_{16}O_{27}$: $Eu^{2+}$ as the blue light-emitting phosphor, $CeMgAl_{11}O_{19}$: $Tb^{3+}$ as the green light-emitting phosphor, and $Y_2O_3$:$Eu^{3+}$ as the red light-emitting phosphor to produce white light.

Other non-limiting examples of blue light-emitting phosphors are $(Ba,Sr,Ca)_5(PO_4)_3(Cl,F,OH)$:$Eu^{2+}$; $(Ba,Sr,Ca)MgAl_{10}O_{17}$:$Eu^{2+}$; and $(Ba,Sr,Ca)BPO_5$:$Eu^{2+}$.

Non-limiting examples of phosphors that emit blue-green light are $Sr_4Al_{14}O_{25}$:$Eu^{2+}$; $BaAl_8O_{13}$:$Eu^{2+}$; $2SrO\cdot0.84P_2O_5\cdot0.16B_2O_3$:$Eu^{2+}$; $MgWO_4$; $BaTiP_2O_8$; $(Ba,Sr,Ca)MgAl_{10}O_{17}$:$Eu^{2+}$,$Mn^{2+}$; and $(Ba,Sr,Ca)_5(PO_4)_3(Cl,F,OH)$:$Sb^{3+}$.

Other non-limiting examples of phosphors that emit green light are $LaPO_4$:$Ce^{3+}$,$Tb^{3+}$; $GdMgB_5O_{10}$:$Ce^{3+}$,$Tb^{3+}$,$Mn^{2+}$; and $GdMgB_5O_{10}$:$Ce^{3+}$, $Tb^{3+}$.

Non-limiting examples of phosphors that emit yellow-orange light are $(Tb,Y,Lu,La,Gd)_3(Al,Ga)_5O_{12}:Ce^{3+}$; and $(Ba,Sr,Ca)_5(PO_4)_3(Cl,F,OH):Eu^{2+}, Mn^{2+}, Sb^{3+}$.

Other non-limiting examples of phosphors that emit red light are $(Y,Gd,La,Lu,Sc)_2O_3:Eu^{3+}$; $(Y,Gd,La,In,Lu,Sc)BO_3:Eu^{3+}$; $(Y,Gd,La)(Al,Ga)O_3:Eu^{3+}$; $(Ba,Sr,Ca)(Y,Gd,La,Lu)_2O_4:Eu^{3+}$; $(Y,Gd)Al_3B_4O_{12}:Eu^{3+}$; monoclinic $Gd_2O_3:Eu^{3+}$; $(Gd,Y)_4(Al,Ga)_2O_9:Eu^{3+}$; $(Ca,Sr)(Gd,Y)_3(Ge,Si)Al_3O_9:Eu^{3+}$; $(Sr,Mg)_3(PO_4)_2:Sn^{2+}$; $GdMgB_5O_{10}:Ce^{3+}, Mn^{2+}$; and $3.5MgO.0.5MgF_2.GeO_2:Mn^{4+}$.

Nanometer-sized particles of inorganic materials, such as the first phosphors herein disclosed, can be prepared by a number of methods. One method of preparation is flame spray pyrolysis of a solution of the precursors of the inorganic material. Such a method is described, for example, in U.S. Pat. No. 5,958,361, which is incorporated herein in its entirety by reference. In this method, an organometallic compound that comprises the desired metals and other heteroatoms in appropriate ratios (to achieve the final chemical composition of the phosphor) is dissolved in a combustible solvent, in which the organomettalic compound is soluble, to form a solution. The solution is then aerosolized into a flame spray pyrolysis reactor in the presence of excess oxygen. The volatile solvent is burned, and the precursors decomposed to produce an inorganic vapor in the correct chemical composition of the final phosphor. The inorganic vapor condenses rapidly in a steep temperature gradient to form nanometer-sized particles of the phosphor. A variation of this technique is found in R. Baranwal et al., "Flame Spray Pyrolysis of Precursors as a Route to Nano-mullite Powder: Powder Characterization and Sintering Behavior," J. Am. Ceram. Soc., Vol. 84, No. 5, pp. 951–61 (2001).

Another method for the preparation of the nanometer-sized particles of inorganic materials is based on the solution-phase inverse-microemulsion technique. A representative description of this technique is found in W. Que et al., "Preparation and Characterization of Erbium Oxalate and Erbium Oxide Nanoparticles by Microemulsion Technique," Materials Science and Engineering C, Vol. 16, pp. 51–54 (2001). In this technique, a thermodynamically stable and optically isotropic dispersion of aqueous microdroplets in a continuous organic (oil) phase is first prepared. The aqueous microdroplets contain inorganic compounds or their precursors in appropriate proportions to achieve the desired final phosphor composition. The microdroplets are stabilized by surfactant molecules at the water-oil interface. The microemulsion is pyrolyzed to produce nanometer-sized particle of the final inorganic material. This technique can produce particle size in the range of about 5–30 nm.

Another method for the preparation of the nanometer-sized particles of inorganic materials is based on the sol-gel method. A representative description of this method is disclosed in R. Subramanian et al., "Synthesis of Nanocrystalline Yttria by Sol-Gel Method," Materials Letters, Vol. 48, pp. 342–346 (May 2001). Nanocrystalline inorganic materials are produced by precipitation by a hydroxide, such as ammonium hydroxide, from a soluble precursor mixture containing all of the desired elements. In an exemplary embodiment, particle sizes in the range from about 20 to 40 nm are produced by this method.

Another method for the preparation of the nanometer-sized particles of inorganic materials is based on the colloidal method. Representative descriptions of this method and one of its variations are disclosed in R. Ramesh et al., "Optical Properties of $Ce^{3+}$ in Self-Assembled Strontium Chloro(hydroxy)apatite Nanocrystals," J. Phys. Chem. B, Vol. 104, pp. 8351–8360 (2000); T. S. Ahmadi et al., "Low-Temperature Synthesis of Pure and Mn-Doped Willemite Phosphor ($Zn_2SiO_4$:Mn) in Aqueous Medium," Materials Research Bulletin, Vol. 35, pp. 1869–1879 (2000); and C. Feldmann et al., "Preparation of Sub-Micrometer $LnPO_4$ Particles (Ln=La, Ce)," J. of Materials Science, Vol. 37, pp. 3251–3254 (2002). A mixture comprising reactants is stirred at high speed at an elevated temperature, and the cooled rapidly to produce nanometer-sized colloidal particles. It is expected that the resulting particle size varies inversely with respect to stirring speed and cooling rate. Particles sizes from about 10 nm to several thousand nanometers may be obtained.

Particles of the second phosphor in the size range from about 2 to about 6 micrometers can be prepared from larger particles by a method such as pulverization or jet milling. Such methods are known in the art. See; e.g., R. H. Perry and D. Green, "Perry's Chemical Engineers' Handbook," 6$^{th}$ ed., pp. 8–38 to 8–47, McGraw-Hill, New York, N.Y. (1984).

Nanometer-sized particles of the first phosphor may be attached to the surface of a particle of the second phosphor with the use of a small amount of binder on the surface of the particle of the second phosphor. Such a binder may be adsorbed first on the surface of the particles of the second phosphor. Then, particles of the first phosphor are mixed into the population of the particles of the second phosphor. Alternatively, particles of the second phosphor are first dispersed in a solution. Then, particles of the first phosphor are added to the dispersion. The ionic strength of the dispersion is then adjusted so as to bring the particles of the first phosphor to the surface of the particles of the second phosphor. The particles of the second phosphor with a coating of nanometer-sized particles of the first phosphor are then filtered and dried for use in the light source of the present invention. It should be understood that there may be some excess particles of the first phosphor in the population of the phosphor particles thus produced. These excess particles of the first phosphor may be removed from the population, if desired, before the coated particles of the second phosphor are disposed in the light source.

The particles of the second phosphor, each of which has a coating of nanometer-sized particles of the first phosphor, are redispersed in a solution, preferably an aqueous solution for disposition on the inner surface of a lamp housing.

In another embodiment, the light source is a compact fluorescent lamp, wherein the sealed housing containing the source of plasma discharge has one or more bends.

In still another embodiment, the electrical discharge that provides charged species for generating the plasma is generated by an induction coil at high frequency. The coil generates a high-frequency magnetic field, which produces a magnetically induced plasma discharge. Such a source of discharge has been put into practice in electrodeless discharge lamps. For example, U.S. Pat. Nos. 4,262,231; 5,952,791; 5,959,405; 6,051,922; and 6,137,236; which are incorporated herein by reference, show various embodiments of electrodeless discharge lamps. Frequencies in the range of greater than about 2 MHz, preferably greater than about 2.5 MHz, can be used to generate the magnetically induced plasma discharge.

The present invention also provides a method for making a light source. The method comprises: (a) providing a source of plasma discharge that emits EM radiation, a portion of which has wavelengths shorter than about 200 nm; (b) containing said source of plasma discharge in a sealed housing; and (c) disposing a phosphor composition in said sealed housing, which phosphor composition comprises a plurality of particles, each of said particles comprising at least a first phosphor and at least a second phosphor, said phosphor composition being disposed such that said first phosphor absorbs substantially said portion of EM radiation having wavelengths shorter than about 200 nm, and said first phosphor emitting EM radiation having wavelengths longer than about 200 nm.

In one aspect, the first phosphor comprises a plurality of nanometer-sized particles of the first phosphor material, which surround a particle of the second phosphor.

In one aspect of the present invention, the method comprises: (a) providing an envelope made of a material that is substantially transparent; (b) depositing a layer of a phosphor composition on an inner surface of said envelope, said phosphor composition comprising a plurality of particles, each of said particle comprising at least a first phosphor and at least a second phosphor; (c) evacuating said envelope to provide an evacuated envelope having said layer of said phosphor composition thereon; (d) adding a first amount of mercury and a second amount of an inert gas into said evacuated envelope; (e) providing a means for generating a plasma discharge from said mercury and said inert gas; and (f) sealing said envelope to produce a light source.

In one aspect, the first phosphor comprises a plurality of nanometer-sized particles of the first phosphor material, the nanometer-sized particles form a coating around each particle of said at least a second phosphor.

In another aspect, the first phosphor material is deposited on a particle of the second phosphor to form a protective shell around the second phosphor material. The first phosphor material can be deposited on the second phosphor by a method selected from the group consisting of chemical vapor deposition and physical vapor deposition.

In one embodiment, the means for generating a plasma discharge comprises a pair of electrodes disposed at opposite ends of the sealed envelope. Each of the electrodes comprises a tungsten filament coated with an oxide of at least one of barium, calcium, and strontium. Electrical leads are supplied to the electrodes to supply electrical power thereto.

In another embodiment, the means for generating a plasma discharge is an induction coil operating a high frequency (as disclosed herein above) and producing a high-frequency magnetic field, which, in turn, produces a magnetically induced plasma discharge.

While various embodiments are described herein, it will be appreciated from the specification that various combinations of elements, variations, equivalents, or improvements therein may be made by those skilled in the art, and are still within the scope of the invention as defined in the appended claims.

What is claimed is:

1. A light source comprising:
a source of plasma discharge that emits electromagnetic ("EM") radiation, a portion of which has wavelengths shorter than about 200 nm; and
a phosphor composition that comprises a plurality of particles, each of said particles comprising at least a first phosphor and at least a second phosphor, said phosphor composition is disposed such that said first phosphor absorbs substantially said portion of EM radiation having wavelengths shorter than about 200 nm, and said first phosphor emits EM radiation having wavelengths longer than about 200 nm, wherein said at least a first phosphor comprises a plurality of nanometer-sized particles disposed around a particle of said second phosphor.

2. A light source comprising:
a source of plasma discharge that emits electromagnetic ("TM") radiation, a portion of which has wavelengths shorter than about 200 nm; and a phosphor composition that comprises a plurality of particles, each of said particles comprising at least a first phosphor and at least a second phosphor, said phosphor composition is disposed such that said first phosphor absorbs substantially said portion of EM radiation having wavelengths shorter than about 200 nm, and said first phosphor emits EM radiation having wavelengths longer than about 200 nm, wherein said at least a first phosphor forms a shell around each particle of said second phosphor.

3. The light source according to claim 1, wherein said source of plasma discharge is contained in a sealed housing.

4. The light source according to claim 1, wherein said source of plasma comprises mercury gas, which produces a plasma discharge upon application of a voltage across the mercury gas.

5. The light source according to claim 4, wherein said nanometer-sized particles of said at least a first phosphor have a size in a range from about 1 nm to about 500 nm.

6. The light source according to claim 4, wherein said nanometer-sized particles of said at least a first phosphor have a size in a range from about 1 nm to about 200 nm.

7. The light source according to claim 4, wherein said nanometer-sized particles of said at least a first phosphor have a size in a range from about 1 nm to about 100 nm.

8. The light source according to claim 4, wherein said particle of said at least a second phosphor have a size in a range from about 1 micrometer to about 6 micrometers.

9. The light source according to claim 4; wherein said at least a first phosphor is selected from the group consisting of $LaPO_4:Pr^{3+}$; $LaB_3O_6:Pr^{3+}$; $LaBO_3:Pr^{3+}$; $YBO_3:Pr^{3+}$; $GdBO_3:Pr^{3+}$; $LuBO_3:Pr^{3+}$; $(Gd,Y)B_3O_6:Pr^{3+}$; $(Sr,Ca)Al_{12}O_{19}:Pr^{3+}$; $(La,Gd,Y)MgB_5O_{10}:Pr^{3+}$; $SrB_4O_7:Pr^{3+}$; $CaMgAl_{11.33}O_{19}:Pr^{3+}$; $CaMgAl_{14}O_{23}:Pr^{3+}$; $YPO_4:Pr^{3+}$; $GdPO_4:Pr^{3+}$; $Y_2SiO_5:Pr^{3+}$; $YPO_4:Bi^{3+}$; $LuPO_4:Bi^{3+}$; $LaPO_4:Pb^{2+}$; $LaB_3O_6:Pb^{2+}$; $LaBO_3:Pb^{2+}$; $YBO_3:Pb^{2+}$; $GdBO_3:Pb^{2+}$; $LuBO_3:Pb^{2+}$; $(Gd,Y)B_3O_6:Pb^{2+}$; $(Sr,Ca)Al_{12}O_{19}:Pb^{2+}$; $(La,Gd,Y)MgB_5O_{10}:Pb^{2+}$; $SrB_4O_7:Pb^{2+}$; $CaMgAl_{11.33}O_{19}:Pb^{2+}$; $CaMgAl_{14}O_{23}:Pb^{2+}$; $YPO_4:Pb^{2+}$; $GdPO_4:Pb^{2+}$; $Y_2SiO_5:Pb^{2+}$; $YPO_4:Pb^{2+}$; $LuPO_4:Pb^{2+}$; $LaPO_4:Pb^{3+},Pb^{2+}$; $LaB_3O_6:Pr^{3+},Pb^{2+}$; $LaBO_3:Pr^{3+},Pb^{2+}$; $YBO_3:Pr^{3+},Pb^{2+}$; $GdBO_3:Pr^{3+},Pb^{2+}$; $LuBO_3:Pr^{3+},Pb^{2+}$; $(Gd,Y)B_3O_6:Pr^{3+},Pb^{2+}$; $(Sr,Ca)Al_{12}O_{19}:Pr^{3+},Pb^{2+}$; $(La,Gd,Y)MgB_5O_{10}:Pr^{3+},Pb^{2+}$; $SrB_4O_7:Pr^{3+},Pb^{2+}$; $CaMgAl_{11.33}O_{19}:Pr^{3+},Pb^{2+}$; $CaMgAl_{14}O_{23}:Pr^{3+},Pb^{2+}$; $YPO_4:Pr^{3+},Pb^{2+}$; $GdPO_4:Pr^{3+}, Pb^{2+}$; $Y_2SiO_5:Pr_{3+},Pb^{2+}$; $YPO_4:Bi^{3+},Pb^{2+}$; $LuPO_4:Bi^{3+},Pb^{2+}$; $LaPO_4:Pr^{3+},Pb_{2+},Bi^{3+}$; $LaB_3O_6:Pr^{3+},Pb^{2+},Bi^{3+}$; $LaBO_3:Pr^{3+},Pb^{2+},Bi^{3+}$; $YBO_3:Pr^{3+},Pb^{2+},Bi^{3+}$; $GdBO_3:Pr^{3+},Pb^{2+},Bi^{3+}$; $LuBO_3:Pr^{3+},Pb^{2+},Bi^{3+}$; $(Gd,Y)B_3O_6:Pr^{3+},Pb^{2+},Bi^{3+}$; $(Sr,Ca)Al_{12}O_{19}:Pr^{3+},Pb^{2+},Bi^{2+}$; $(La,Gd,Y)MgB_5O_{10}:Pr^{3+},Pb^{2+},Bi^{3+}$; $SrB_4O_7, :Pr^{3+},Pb^{2+},Bi^{3+}$; $CaMgAl_{11.33}O_{19}:Pr^{3+},Pb^{2+},Bi^{3+}$; $CaMgAl_{14} O_{23}:Pr^{3+}, Pb^{2+}, Bi^{3+}$; $YPO_4:Pb^{3+},Pb^{2+},Bi^{3+}$; $GdPO_4:Pr^{3+},Pb^{2+},Bi^{3+}$; $Y_2SiO_5:Pr^{3+},Pb^{2+},Bi^{3+}$; $YPO_4:Pr^{3+},Bi^{3+},Pb^{2+}$; $LuPO_4:Pr^{3+},Bi^{3+},Pb^{2+}$; $(Ca,Mg,Sr)SO_4:Pb^{2+}$; $CaLi_2SiO_4:Pb^{2+}$; $(Ca,Ba,Sr)SiO_3:Pb^{2+}$; $Ba(Y,Gd,Lu)B_9O_{16}:Bi^{3+}$; $YF_3:Bi^{3+}$; $YOF:Bi^{3+}$; $(Gd,Y)OF:Bi^{3+},Pr^{3+}$; $(Y,Gd)_3Al_5O_{12}:Bi^{3+}$; and combinations thereof.

10. The light source according to claim 9, wherein said nanometer-sized particles of said first phosphor is produced by a method selected from the group consisting of flame spray pyrolysis, iriverse-microemulsion, sol-gel, and colloidal suspension.

11. The light source according to claim 4; wherein said at least a first phosphor is selected from the group consisting of LaPO$_4$:Pr$^{3+}$; LaB$_3$O$_6$:Pr$^{3+}$; LaBO$_3$:Pr$^{3+}$; YBO$_3$Pr$^{3+}$; GdBO$_3$:Pr$^{3+}$; LuBO$_3$:Pr$^{3+}$; (Gd,Y)B$_3$O$_6$:Pr$^{3+}$; (Sr,Ca)Al$_{12}$O$_{19}$:Pr$^{3+}$; (La,Gd,Y)MgB$_5$O$_{10}$:Pr$^{3+}$; SrB$_4$O$_7$:Pr$^{3+}$; CaMgAl$_{11.33}$O$_{19}$:Pr$^{3+}$; CaMgAl$_{14}$O$_{23}$:Pr$^{3+}$; YPO$_4$:Pr$^{3+}$; GdPO$_4$:Pr$^{3+}$; Y$_2$SiO$_5$:Pr$^{3+}$; YPO$_4$:Bi$^{3+}$; LuPO$_4$:Bi$^{3+}$; (Ca,Mg,Sr)SO$_4$:Pb$^{3+}$; CaLi$_2$SiO$_4$:Pb$^{2+}$; (Ca,Ba,Sr)SiO$_3$:Pb$^{2+}$; Ba(Y,Gd,Lu)B$_9$O$_{16}$:Bi$^{3+}$; YF$_3$:Bi$^{3+}$; YOF:Bi$^{3+}$; (Gd,Y)OF:Bi$^{3+}$,Pr$^{3+}$; (Y,Gd)$_3$Al$_5$O$_{12}$:Bi$^{3+}$; and combinations thereof.

12. The light source according to claim 4, wherein said at least a second phosphor absorbs a portion of radiation emitted by said plasma discharge that has wavelengths longer than about 200 nm and radiation emitted by said at least a first phosphor, and said at least a second phosphor emits visible light.

13. The light source according to claim 12; wherein said at least a second phosphor is selected from the group consisting of BaMg$_2$Al$_{16}$O$_{27}$:Eu$^{2+}$; CeMgAl$_{11}$O$_{19}$:Tb$^{3+}$; Y$_2$O$_3$:Eu$^{3+}$; (Ba,Sr,Ca)$_5$(PO$_4$)$_3$(Cl,F,OH):Eu$^{2+}$; (Ba,Sr,Ca)MgAl$_{10}$O$_{17}$: Eu$^{2+}$; (Ba,Sr,Ca)BPO$_5$:Eu$^{2+}$; Sr$_4$Al$_{14}$O$_{25}$:Eu$^{2+}$; BaAl$_8$O$_{13}$:Eu$^{2+}$; 2SrO.0.84P$_2$O$_5$.0.16B$_2$O$_3$:Eu$^{2+}$; MgWO$_4$; BaTiP$_2$O$_8$; (Ba,Sr,Ca)MgAl$_{10}$O$_{17}$:Eu$^{2+}$,Mn$^{2+}$; (Ba,Sr,Ca)$_5$(PO$_4$)$_3$(Cl,F,OH):Sb$^{3+}$; LaPO$_4$:Ce$^{3+}$,Tb$^{3+}$; GdMgB$_5$O$_{10}$:Ce$^{3+}$,Tb$^{3+}$, Mn$^{2+}$; GdMgB$_5$O$_{10}$:Ce$^{3+}$, Tb$^{3+}$; (Tb,Y,Lu,La,Gd)$_3$ (Al,Ga)$_5$O$_{12}$:Ce$^{3+}$; (Ba,Sr,Ca)$_5$(PO$_4$)$_3$(Cl,F,OH):Eu$^{2+}$, Mn$^{2+}$, Sb$^{3+}$; (Y,Gd,La,Lu,Sc)$_2$O$_3$:Eu$^{3+}$; (Y,Gd,La,In,Lu,Sc)BO$_3$:Eu$^{3+}$; (Y,Gd,La)(Al,Ga)O$_3$:Eu$^{3+}$; (Ba,Sr,Ca)(Y,Gd,La,Lu)$_2$O$_4$:Eu$^{3+}$; (Y,Gd)Al$_3$B$_4$O$_{12}$:Eu$^{3+}$; monoclinic Gd$_2$O$_3$:Eu$^{3+}$; (Gd,Y)$_4$(Al,Ga)$_2$O$_9$:Eu$^{3+}$; (Ca,Sr)(Gd,Y)$_3$(Ge,Si)Al$_3$O$_9$:Eu$^{3+}$; (Sr,Mg)$_3$(PO$_4$)$_2$:Sn$^{2+}$; GdMgB$_5$O$_{10}$:Ce$^{3+}$,Mn$^{2+}$; 3.5MgO.0.5MgF$_2$.GeO$_2$:Mn$^{4+}$; and combinations thereof.

14. The light source according to claim 4, wherein said light source is selected from the group consisting of fluorescent lamps, compact fluorescent lamps, and electrodeless fluorescent lamps.

15. A light source comprising:
a source of plasma discharge that emits EM radiation, a portion of which has wavelengths shorter than about 200 nm, said source of plasma discharge being contained in a sealed housing and comprising mercury gas, which produces said plasma discharge upon application of a voltage across said mercury gas; and
a phosphor composition that comprises a plurality of particles of at least a first phosphor and a plurality of particles of at least a second phosphor, wherein said particles of said at least a first phosphor have a nanometer size, each of particles of said at least a second phosphor is coated with particles of said at least a first phosphor, said phosphor composition is disposed such that said first phosphor absorbs substantially said portion of EM radiation having wavelengths shorter than about 200 nm, and said first phosphor emits EM radiation having wavelengths longer than about 200 nm;
wherein said particles of said at least a first phosphor have a size in a range from about 1 nm to about 500 nm;
said particles of said at least a second phosphor have a size in a range from about 2 micrometers to about 6 micrometers;
said at least a first phosphor is selected from the group consisting of LaPO$_4$:Pr$^{3+}$; LaB$_3$O$_6$:Pr$^{3+}$; LaBO$_3$:Pr$^{3+}$; YBO$_3$:Pr$^{3+}$; GdBO$_3$:Pr$^{3+}$; LuBO$_3$:Pr$^{3+}$; (Gd,Y)B$_3$O$_6$:Pr$^{3+}$; Sr,Ca)Al$_{12}$O$_{19}$:Pr$^{3+}$; (La,Gd,Y)MgB$_5$O$_{10}$:Pr$^{3+}$; SrB$_4$O$_7$:Pr$^{3+}$; CaMgAl$_{11.33}$O$_{19}$:Pr$^{3+}$; CaMgAl$_{14}$O$_{23}$:Pr$^{3+}$; YPO$_4$:Pr$^{3+}$; GdPO$_4$:Pr$^{3+}$; Y$_2$SiO$_5$:Pr$^{3+}$; YPO$_4$:Bi$^{3+}$; LuPO$_4$:Bi$^{3+}$; LaPO$_4$:Pb$^{2+}$; LaB$_3$O$_6$:Pb$^{2+}$; LaBO$_3$:Pb$^{2+}$; YBO$_3$:Pb$^{2+}$; GdBO$_3$:Pb$^{2+}$; LuBO$_3$:Pb$^{2+}$; (Gd,Y)B$_3$O$_6$:Pb$^{2+}$; (Sr,Ca)Al$_{12}$O$_{19}$:Pb$^{2+}$; (La,Gd,Y)MgB$_5$O$_{10}$:Pb$^{2+}$; SrB$_4$O$_7$:Pb$^{2+}$; CaMgAl$_{11.33}$O$_{19}$:Pb$^{2+}$; CaMgAl$_{14}$O$_{23}$:Pb$^{2+}$; YPO$_4$:Pb$^{2+}$; GdPO$_4$:Pb$^{2+}$; Y$_2$SiO$_5$:Pb$^{2+}$; YPO$_4$:Pb$^{2+}$; LuPO$_4$:Pb$^{2+}$; LaPO$_4$:Pr$^{3+}$,Pb$^{2+}$; LaB$_3$O$_6$:Pr$^{3+}$,Pb$^{2+}$; LaBO$_3$:Pr$^{3+}$,Pb$^{2+}$; YBO$_3$:Pr$^{3+}$,Pb$^{2+}$; GdBO$_3$:Pr$^{3+}$,Pb$^{2+}$; LuBO$_3$:Pr$^{3+}$,Pb$^{2+}$; (Gd,Y)B$_3$O$_6$:Pr$^{3+}$,Pb$^{2+}$; (Sr,Ca)Al$_{12}$O$_{19}$:Pr$^{3+}$,Pb$^{2+}$; (La,Gd,Y)MgB$_5$O$_{10}$:Pr$^{3+}$,Pb$^{2+}$; SrB$_4$O$_7$:Pr$^{3+}$,Pb$^{2+}$; CaMgAl$_{11.33}$O$_{19}$:Pr$^{3+}$,Pb$^{2+}$; CaMgAl$_{14}$O$_{23}$:Pr$^{3+}$,Pb$^{2+}$; YPO$_4$:Pr$^{3+}$,Pb$^{2+}$;GdPO$_4$:Pr$^{3+}$,Pb$^{2+}$; Y$_2$SiO$_5$:Pr$^{3+}$,Pb$^{2+}$; YPO$_4$:Bi$^{3+}$, Pb$^{2+}$; LuPO$_4$:Bi$^{3+}$,Pb$^{2+}$; LaPO$_4$:Bi$^{3+}$,Pb$^{2+}$; LaPO$_4$:Pr$^{3+}$,Pb$^{2+}$,Bi$^{3+}$; LaBO$_3$O$_6$:Pr$^{3+}$,Pb$^{2+}$,Bi$^{3+}$; LaBO$_3$:Pr$^{3+}$, Pb$^{2+}$,Bi$^{3+}$; YBO$_3$:Pr$^{3+}$,Pb$^{2+}$,Bi$^{3+}$; GdBO$_3$:Pr$^{3+}$,Pb$^{2+}$,Bi$^{3+}$; LuBO$_3$:Pr$^{3+}$,Pb$^{2+}$,Bi$^{3+}$; (Gd,Y)B$_3$O$_6$:Pr$^{3+}$,Pb$^{2+}$,Bi$^{3+}$; (Sr,Ca)Al$_{12}$O$_{19}$:Pr$^{3+}$,Pb$^{2+}$,Bi$^{3+}$; (La,Gd,Y)MgB$_5$O$_{10}$:Pr$^{3+}$,Pb$^{2+}$,Bi$^{3+}$; SrB$_4$O$_7$:Pr$^{3+}$,Pb$^{2+}$,Bi$^{3+}$; CaMgAl$_{11.33}$O$_{19}$:Pr$^{3+}$,Pb$^{2+}$,Bi$^{3+}$; CaMgAl$_{14}$O$_{23}$:Pr$^{3+}$,Pb$^{2+}$,Bi$^{3+}$; YPO$_4$:Pr$^{3+}$,Pb$^{2+}$,Bi$^{3+}$; GdPO$_4$:Pr$^{3+}$,Pb$^{2+}$,Bi$^{3+}$; Y$_2$SiO$_5$:Pr$^{3+}$,Pb$^{2+}$,Bi$^{3+}$; YPO$_4$:Pr$^{3+}$,Bi$^{3+}$,Pb$^{2+}$; LuPO$_4$:Pr$^{3+}$,Bi$^{3+}$,Pb$^{2+}$; (Ca,Mg,Sr)SO$_4$:Pb$^{2+}$; CaLi$_2$SiO$_4$:Pb$^{2+}$; (Ca,Ba,Sr)SiO$_3$:Pb$^{2+}$; Ba(Y,Gd,Lu)B$_9$O$_{16}$:Bi$^{3+}$; YF$_3$:Bi$^{3+}$; YOF:Bi$^{3+}$; (Gd,Y)OF:Bi$^{3+}$,Pr$^{3+}$; (Y,Gd)$_3$Al$_5$O$_{12}$:Bi$^{3+}$; combinations thereof; and
said at least a second phosphor emits visible light and is selected from the group consisting of BaMg$_2$Al$_{16}$O$_{27}$:Eu$^{2+}$; CeMgAl$_{11}$O$_{19}$:Tb$^{3+}$; Y$_2$O$_3$:Eu$^{3+}$; (Ba,Sr,Ca)$_5$(PO$_4$)$_3$(Cl,F,OH):Eu$^{2+}$; (Ba,Sr,Ca)MgAl$_{10}$O$_{17}$:Eu$^{2+}$; (Ba,Sr,Ca)BPO$_5$:Eu$^{2+}$; Sr$_4$Al$_{14}$O$_{25}$:Eu$^{2+}$; BaAl$_8$O$_{13}$:Eu$^{2+}$; 2S$_r$O.0.84P$_2$O$_5$.0.16B$_2$O$_3$:Eu$^{2+}$; MgWO$_4$; BaTiP$_2$O$_8$; (Ba,Sr,Ca)MgAl$_{10}$O$_{17}$:Eu$^{2+}$, Mn$^{2+}$; (Ba,Sr,Ca)$_5$(PO$_4$)$_3$(Cl,F,OH):Sb$^{3+}$; LaPO$_4$:Ce$^{3+}$,Tb$^{3+}$; GdMgB$_5$O$_{10}$:Ce$^{3+}$, Tb$^{3+}$, Mn$^{2+}$; GdMgB$_5$O$_{10}$:Ce$^{3+}$, Tb$^{3+}$; (Tb,Y,Lu,La,Gd)$_3$ (Al,Ga)$_5$O$_{12}$:Ce$^{3+}$; (Ba,Sr,Ca)$_5$(PO$^4$)$_3$(Cl,F,OH):Eu$^{2+}$, Mn$^{2+}$, Sb$^{3+}$; (Y,Gd,La,Lu,Sc)$_2$O$_3$:Eu$^{3+}$; (Y,Gd,La,In,Lu,Sc)BO$_3$:Eu$^{3+}$; (Y,Gd,La)(Al,Ga)O$_3$:Eu$^{3+}$; (Ba,Sr,Ca)(Y,Gd,La,Lu)$_2$O$_4$:Eu$^{3+}$; (Y,Gd)Al$_3$B$_4$O$_{12}$:Eu$^{3+}$; monoclinic Gd$_2$O$_3$:Eu$^{3+}$; (Gd,Y)$_4$(Al,Ga)$_2$O$_9$:Eu$^{3+}$; (Ca,Sr)(Gd,Y)$_3$(Ge,Si)Al$_3$O$_9$:Eu$^{3+}$; (Sr,Mg)$_3$(PO$_4$)$_2$:Sn$^{2+}$; GdMgB$_5$O$_{10}$:Ce$^{3+}$,Mn$^{2+}$; 3.5MgO.0.5MgF$_2$.GeO$_2$:Mn$^{4+}$; and combinations thereof.

16. A light source comprising:
a source of plasma discharge that emits EM radiation, a portion of which has wavelengths shorter than about 200 nm, said source of plasma discharge being contained in a sealed housing and comprising mercury gas, which produces said plasma discharge upon application of a voltage across said mercury gas; and
a phosphor composition that comprises a plurality of particles of at least a first phosphor and a plurality of particles at least a second phosphor, wherein said particles of said at least a first phosphor have a nanometer size, each of particles of said at least a second phosphor is coated with particles of said at least a first phosphor, said phosphor composition is disposed such that said first phosphor absorbs substantially said portion of EM radiation having wavelengths shorter than about 200 nm, and said first phosphor emits EM radiation having wavelengths longer than about 200 nm;
wherein said particles of said at least a first phosphor have a size in a range from about 1 nm to about 500 nm;
said particles of said at least a second phosphor have a size in a range from about 2 micrometers to about 6 micrometers;

said at least a first phosphor is selected from the group consisting of $LaPO_4:Pr^{3+}$; $LaB_3O_6:Pr^{3+}$; $LaBO_3:Pr^{3+}$; $YBO_3:Pr^{3+}$; $GdBO_3:Pr^{3+}$; $LuBO_3:Pr^{3+}$; $(Gd,Y)B_3O_6:Pr^{3+}$; $(Sr,Ca)Al_{12}O_{19}:Pr^{3+}$; $(La,Gd,Y)MgB_5O_{10}:Pr^{3+}$; $SrB_4O_7:Pr^{3+}$; $CaMgAl_{11.33}O_{19}:Pr^{3+}$; $CaMgAl_{14}O_{23}:Pr^{3+}$; $YPO_4:Pr^{3+}$; $GdPO_4:Pr^{3+}$; $Y_2SiO_5:Pr^{3+}$; $YPO_4:Bi^{3+}$; $LuPO_4:Bi^{3+}$; $(Ca,Mg,Sr)SO_4:Pb^{2+}$; $CaLi_2SiO_4:Pb^{2+}$; $(Ca,Ba,Sr)SiO_3:Pb^{2+}$; $Ba(Y,Gd,Lu)B_9O_{16}:Bi^{3+}$; $YF_3:Bi^{3+}$; $YOF:Bi^{3+}$; $(Gd,Y)OF:Bi^{3+},Pr^{3+}$; $(Y,Gd)_3Al_5O_{12}:Bi^{3+}$; and combinations thereof; and said at least a second phosphor emits visible light and is selected from the group consisting of $BaMg_2Al_{16}O_{27}:Eu^{2+}$; $CeMgAl_{11}O_{19}:Tb^{3+}$; $Y_2O_3:Eu^{3+}$; $(Ba,Sr,Ca)_5(PO_4)_3(Cl,F,OH):Eu^{2+}$; $(Ba,Sr,Ca)MgAl_{10}O_{17}:Eu^{2+}$; $(Ba,Sr,Ca)BPO_5:Eu^{2+}$; $Sr_4Al_{14}O_{25}:Eu^{2+}$; $BaAl_8O_{13}:Eu^{2+}$; $2SrO.0.84P_2O_5.0.16B_2O_3:Eu^{2+}$; $MgWO_4$; $BaTiP_2O_8$; $(Ba,Sr,Ca)MgAl_{10}O_{17}:Eu^{2+},Mn^{2+}$; $(Ba,Sr,Ca)_5(PO_4)_3(Cl,F,OH):Sb^{3+}$; $LaPO_4:Ce^{3+},Tb^{3+}$; $GdMgB_5O_{10}:Ce^{3+}$, $Tb^{3+}$, $Mn^{2+}$; $GdMgB_5O_{10}:Ce^{3+}$, $Tb^{3+}$; $(Tb,Y,Lu,La,Gd)_3(Al,Ga)_5O_{12}:Ce^{3+}$; $(Ba,Sr,Ca)_5(PO_4)_3(Cl,F,OH):Eu^{2+}$, $Mn^{2+}$, $Sb^{3+}$; $(Y,Gd,La,Lu,Sc)_2O_3:Eu^{3+}$; $(Y,Gd,La,In,Lu,Sc)BO_3:Eu^{3+}$; $(Y,Gd,La)(Al,Ga)O_3:Eu^{3+}$; $(Ba,Sr,Ca)(Y,Gd,La,Lu)_2O_4:Eu^{3+}$; $(Y,Gd)Al_3B_4O_{12}:Eu^{3+}$; monoclinic $Gd_2O_3:Eu^{3+}$; $(Gd,Y)_4(Al,Ga)_2O_9:Eu^{3+}$; $(Ca,Sr)(Gd,Y)_3(Ge,Si)Al_3O_9:Eu^{3+}$; $(Sr,Mg)_3(PO_4)_2:Sn^{2+}$; $GdMgB_5O_{10}:Ce^{3+},Mn^{2+}$; $3.5MgO.0.5MgF_2.GeO_2:Mn^{4+}$; and combinations thereof.

17. A method for making a light source, said method comprising:
providing a source of plasma discharge that emits EM radiation, a portion of which has wavelengths shorter than about 200 nm;
containing said source of plasma discharge in a sealed housing; and
disposing a phosphor composition in said seaed housing, which phosphor composition comprises a plurality of particles, each of said particle comprising at least a first phosphor and at least a second phosphor, said at least a first phosphor being disposed around each particle of said second phosphor, and said phosphor composition being disposed such that said first phosphor absorbs substantially said portion of EM radiation having wavelengths shorter than about 200 nm, and said first phosphor emitting EM radiation having wavelengths longer than about 200 nm.

18. The method according to claim 17, wherein said source of plasma discharge comprises mercury gas, which produces a plasma discharge upon application of a voltage across said mercury gas.

19. The method according to claim 18, wherein said providing said plasma source comprises providing an amount of mercury sufficient to maintain a mercury vapor pressure of about 0.8 Pa at a temperature of about 40° C.

20. A method for making a light source, said method comprising:
providing an envelope made of a material, that is substantially transparent;
depositing a layer of a phosphor composition on an inner surface of said envelope, said phosphor composition comprising a plurality of particles, each of said particles comprising at least a first phosphor and at least a second phosphor, said at least a first phosphor fanning a coating around each of particles of said at least a second phosphor;
evacuating said envelope to provide an evacuated envelope having said layer of said phosphor composition thereon;
adding a first amount of mercury and a second amount of an inert gas into said evacuated envelope;
providing a means for generating a plasma discharge from said mercury and said inert gas; and
sealing said envelope to produce said light source.

21. The method according to claim 20, wherein said forming a coating comprises depositing a plurality of nanometer-sized particles of said first phosphor around each particle of said second phosphor.

22. The method according to claim 21, wherein said first amount of mercury is sufficient to maintain a mercury vapor pressure of about 0.8 Pa at a temperature of about 40° C.

23. A phosphor composition comprising a plurality of particles, each of said particles comprising at least a first phosphor and at least a second phosphor, said first phosphor being capable of absorbing EM radiation having wavelengths shorter than about 200 nm, and being capable of emitting EM radiation having wavelengths longer than about 200 nm, wherein said first phosphor comprises a plurality of nanometer-sized particles, which are disposed around a particle of said second phosphor.

24. A phosphor composition comprising a plurality of particles, each of said particles comprising at least a first phosphor and at least a second phosphor, said first phosphor being capable of absorbing EM radiation having wavelengths shorter than about 200 nm, and being capable of emitting EM radiation having wavelengths longer than about 200 nm, wherein said first phosphor comprises a shell around a particle of said second phosphor.

* * * * *

UNITED STATES PATENT AND TRADEMARK OFFICE
CERTIFICATE OF CORRECTION

| | | |
|---|---|---|
| PATENT NO. | : 6,982,046 B2 | Page 1 of 1 |
| APPLICATION NO. | : 10/674376 | |
| DATED | : January 3, 2006 | |
| INVENTOR(S) | : Alok Mani Srivastava | |

It is certified that error appears in the above-identified patent and that said Letters Patent is hereby corrected as shown below:

2. Col. 8, Claim should read-- A light source comprising:

a source of plasma discharge that emits electromagnetic ("EM") radiation, a portion of which has wavelengths shorter that about 200nm; and a phosphor composition that comprises a plurality of particles, each of said particles comprising at least a first phosphor and at least a second phosphor, said phosphor composition is disposed such that said first phosphor absorbs substantially said portion of EM radiation having wavelengths shorter than about 200 nm, and said first phosphor emits EM radiation having wavelengths longer than about 200 nm, wherein said at least a first phosphor forms a shell around each particle of said second phosphor.

Signed and Sealed this

Eighth Day of August, 2006

JON W. DUDAS
*Director of the United States Patent and Trademark Office*